US009760933B1

(12) United States Patent
Cai et al.

(10) Patent No.: US 9,760,933 B1
(45) Date of Patent: Sep. 12, 2017

(54) INTERACTIVE SHOPPING ADVISOR FOR REFINANCING PRODUCT QUERIES

(71) Applicant: International Business Machines Corporation, Armonk, NY (US)

(72) Inventors: Keke Cai, Beijing (CN); Yue Chen, Beijing (CN); Zhong Su, Beijing (CN); Enliang Xu, Beijing (CN); Hao Zhang, Beijing (CN); Li Zhang, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/347,120

(22) Filed: Nov. 9, 2016

(51) Int. Cl.
  G06Q 30/06 (2012.01)
  G06F 17/30 (2006.01)

(52) U.S. Cl.
  CPC ..... *G06Q 30/0627* (2013.01); *G06F 17/3043* (2013.01); *G06F 17/30864* (2013.01); *G06Q 30/0623* (2013.01); *G06Q 30/0625* (2013.01)

(58) Field of Classification Search
  None
  See application file for complete search history.

(56) References Cited

U.S. PATENT DOCUMENTS

| | | | | |
|---|---|---|---|---|
| 6,847,963 B1* | 1/2005 | Paclat | ............ | G06F 17/30867 |
| 7,328,177 B1 | 2/2008 | Lin-Hendel | | |
| 7,505,921 B1* | 3/2009 | Lukas | ............ | G06Q 30/0603 |
| | | | | 705/26.5 |
| 7,707,220 B2* | 4/2010 | Bonabeau | ......... | G06F 17/30864 |
| | | | | 706/13 |
| 7,865,407 B2* | 1/2011 | Kraft | ..................... | G06Q 30/02 |
| | | | | 705/26.61 |
| 8,078,502 B2* | 12/2011 | Hao | ..................... | G06F 17/243 |
| | | | | 705/26.61 |
| 8,214,264 B2 | 7/2012 | Kasavin et al. | | |
| 8,412,727 B1* | 4/2013 | Das | ..................... | G06F 17/3097 |
| | | | | 707/767 |

(Continued)

FOREIGN PATENT DOCUMENTS

| CN | CN102800006 A | 11/2012 |
|---|---|---|
| WO | WO0127816 A1 | 4/2001 |
| WO | WO-2015/097544 A1 * | 7/2015 |

OTHER PUBLICATIONS

Desai, B.C., et al. "Multilevel Interface to a Distributed Database System," Lecture Notes in Artificial Intelligence, vol. 542, pp. 122-131, Springer Verlag, New York, 1991.*

(Continued)

*Primary Examiner* — Nicholas D Rosen
(74) *Attorney, Agent, or Firm* — Scully, Scott, Murphy & Presser, P.C.; Keivan E. Razavi

(57) ABSTRACT

An interactive shopping advisor receives a natural language query for a product search, generates an initial product recommendation from the natural language query, receives a natural language preference parameter for refining the product search, maps the natural language preference parameter to a product attribute value for the product search, identifies an adjustment orientation of the product attribute value from the natural language preference parameter, and applies the adjustment orientation to the natural language query to provide a refined product recommendation for the product search.

24 Claims, 8 Drawing Sheets

(56) References Cited

U.S. PATENT DOCUMENTS

| | | | | |
|---|---|---|---|---|
| 8,429,026 B1* | 4/2013 | Kolawa | ............. | G06Q 30/00 |
| | | | | 705/26.7 |
| 2003/0167213 A1* | 9/2003 | Jammes | ............. | G06F 17/3089 |
| | | | | 705/26.62 |
| 2005/0010484 A1* | 1/2005 | Bohannon | ............. | G06Q 30/06 |
| | | | | 705/26.5 |
| 2006/0020614 A1* | 1/2006 | Kolawa | ............. | G06Q 30/02 |
| 2006/0282304 A1* | 12/2006 | Bedard | ............. | G06F 17/30867 |
| | | | | 705/7.33 |
| 2007/0067279 A1* | 3/2007 | Bonabeau | ............. | G06F 17/30864 |
| 2008/0091572 A1* | 4/2008 | Kraft | ............. | G06Q 30/02 |
| | | | | 705/26.41 |
| 2008/0189187 A1* | 8/2008 | Hao | ............. | G06F 17/243 |
| | | | | 705/26.41 |
| 2010/0042469 A1* | 2/2010 | Chandrasekar | ............. | G06Q 30/0207 |
| | | | | 705/14.54 |
| 2010/0312650 A1* | 12/2010 | Pinckney | ............. | G06F 17/30867 |
| | | | | 705/14.66 |
| 2011/0270684 A1* | 11/2011 | Holtzman | ............. | G06Q 30/0269 |
| | | | | 705/14.66 |
| 2013/0066740 A1* | 3/2013 | Ouimet | ............. | G06Q 30/06 |
| | | | | 705/26.7 |
| 2014/0201126 A1* | 7/2014 | Zadeh | ............. | G06K 9/627 |
| | | | | 706/52 |
| 2014/0280179 A1* | 9/2014 | Coleman | ............. | G06F 17/30643 |
| | | | | 707/740 |
| 2015/0356401 A1* | 12/2015 | Vinyals | ............. | G06N 3/02 |
| | | | | 706/15 |
| 2016/0125501 A1* | 5/2016 | Nemery | ............. | G06Q 30/0631 |
| | | | | 705/26.7 |
| 2016/0180434 A1* | 6/2016 | Knight | ............. | G06F 17/30522 |
| | | | | 705/26.63 |
| 2016/0321705 A1* | 11/2016 | Scheidelman | ............. | G06F 17/27 |

OTHER PUBLICATIONS

Anon., "System and Business Process of Using Natural Language Dialog with User Preferences," IP.com, IPCOM000016356D, electronic publication date Jun. 21, 2003.*

Taft, Darryl K., "IBM, The North Face, Fluid Team on Watson-Based Shopping Aide" posted on Dec. 14, 2015, pp. 1-7.

Xiao, Bo., "E-Commerce Product Recommendation Agents: Use Characteristics, and Impact" Mar. 2007, Mis Quarterly vol. 31 No. 1, pp. 137-209.

* cited by examiner

INTERACTIVE SHOPPING ADVISOR FOR REFINANCING PRODUCT QUERIES

FIELD

The present application relates generally to automated shopping advisors and, more particularly, to an automated shopping advisor that iteratively refines product queries by using one or more product properties to determine user preferences.

BACKGROUND

As a result of current developments in the fields of information technology and communications, the experience of shopping has undergone a series of dramatic transformations. Whereas many traditional shopping malls are in decline, Internet-based online shopping is enjoying immense popularity. Internet shopping, although capable of providing convenient purchasing of products from one's home with a simple click of a mouse, also presents various shortcomings which affect both consumers and retailers. On the consumer side, the amount of time spent searching for a desired product is highly dependent on the level of the consumer's experience and know-how. To the unwary and the inexperienced, online shopping often proves to be a time-consuming and frustrating experience. Another drawback to Internet shopping is the lack of interaction between consumers and retailers. From the perspective of the consumer, website search results are nothing more than a collection of on-line catalogs. Online shopping lacks the interactive nature of shopping at a traditional brick-and-mortar store where a consumer may ask spontaneous questions about a product, obtain immediate advice from a salesperson, and browse a wide selection of products in detail. While engaged in Internet shopping, a consumer lacks access to additional information and suggestions that may come from a salesperson as would normally be the case if the purchase was being conducted in a conventional retail environment. Although a certain degree of product or service information may be provided on a website, such information will not suffice to answer all of the questions that a consumer may have. Many vendor websites supply limited, inadequate, or outdated information about a product. The shopper is then compelled to follow up with a question to the vendor by email, or by completing an online inquiry form. It may take some time for the shopper to receive a response and, in some cases, the question remains unanswered. Thus, there exists a need to overcome at least one of the preceding deficiencies and limitations of the related art.

SUMMARY

The following summary is merely intended to be exemplary. The summary is not intended to limit the scope of the claims.

A method for providing an interactive shopping advisor, in one aspect, may comprise receiving a natural language query for a product search, generating an initial product recommendation from the natural language query, receiving a natural language preference parameter for refining the product search, mapping the natural language preference parameter to a product attribute value for the product search, identifying an adjustment orientation of the product attribute value from the natural language preference parameter, and applying the adjustment orientation to the natural language query to provide a refined product recommendation for the product search.

A computer program product for providing an interactive shopping advisor, in another aspect, may comprise a computer-readable storage medium having a computer-readable program stored therein, wherein the computer-readable program, when executed on a processor, causes the processor to receive a natural language query for a product search, generate an initial product recommendation from the natural language query, receive a natural language preference parameter for refining the product search, map the natural language preference parameter to a product attribute value for the product search, identify an adjustment orientation of the product attribute value from the natural language preference parameter, and apply the adjustment orientation to the natural language query to provide a refined product recommendation for the product search.

An apparatus for providing an interactive shopping advisor, in another aspect, may comprise a processor and a memory coupled to the processor, wherein the memory comprises instructions which, when executed by the processor, cause the processor to receive a natural language query for a product search, generate an initial product recommendation from the natural language query, receive a natural language preference parameter for refining the product search, map the natural language preference parameter to a product attribute value for the product search, identify an adjustment orientation of the product attribute value from the natural language preference parameter, and apply the adjustment orientation to the natural language query to provide a refined product recommendation for the product search.

A system for providing an interactive shopping advisor, in another aspect, may comprise a mobile device operatively coupled to a computer server. The computer server receives a natural language query from the mobile device for a product search, generates an initial product recommendation from the natural language query, transmits the initial product recommendation to the mobile device, receives a natural language preference parameter from the mobile device for refining the product search, maps the natural language preference parameter to a product attribute value for the product search, identifies an adjustment orientation of the product attribute value from the natural language preference parameter, applies the adjustment orientation to the natural language query to provide a refined product recommendation for the product search, and transmits the refined product recommendation to the mobile device.

An interactive shopping advisor, in another aspect, may comprise one or more processors for executing programs; a non-transitory memory operatively connected to the one or more processors; a network interface device operatively connected to the one or more processors for communicating with a user via a communications network; and a program stored in the memory for receiving a natural language query for a product search, generating an initial product recommendation from the natural language query, receiving a natural language preference parameter for refining the product search, mapping the natural language preference parameter to a product attribute value for the product search, identifying an adjustment orientation of the product attribute value from the natural language preference parameter, and applying the adjustment orientation to the natural language query to provide a refined product recommendation for the product search.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
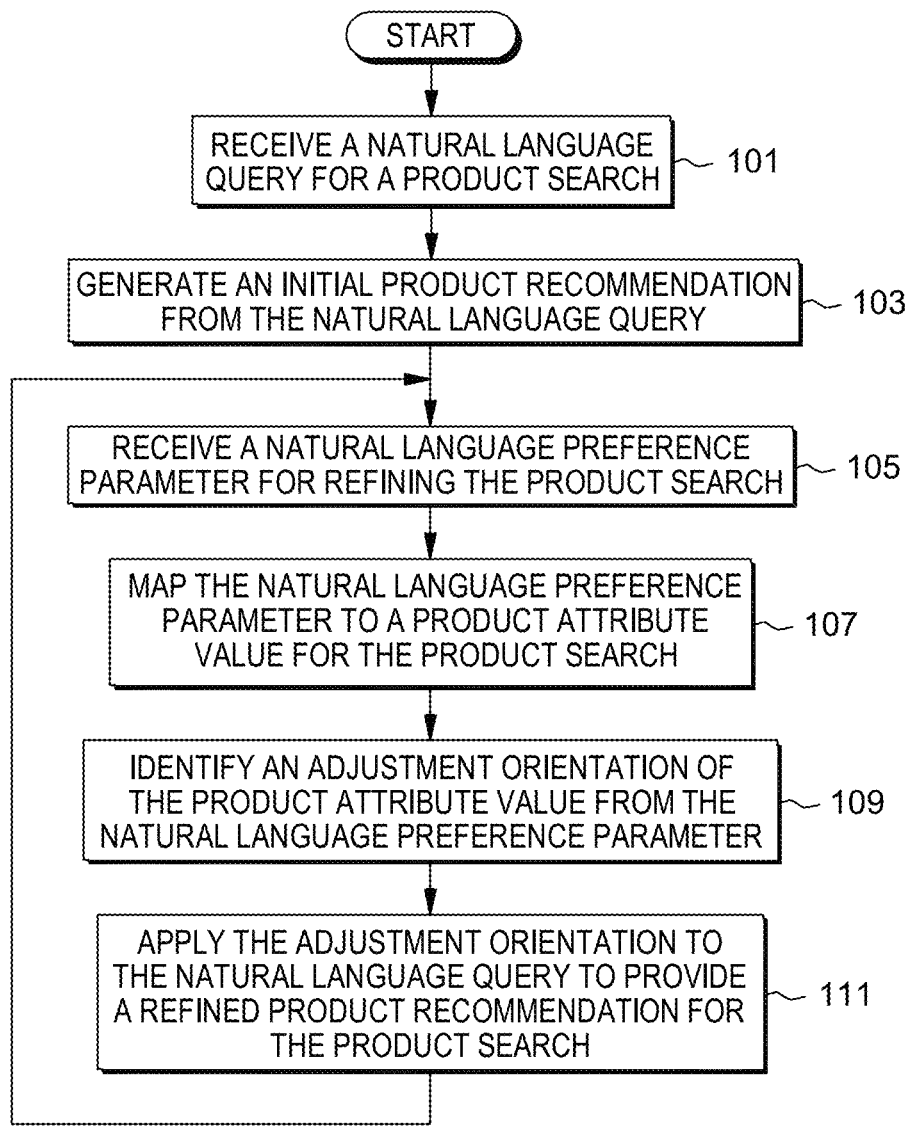
FIG. 1 is a flowchart illustrating an exemplary method for providing an interactive shopping advisor in accordance with one set of embodiments of the present disclosure.

FIG. 1 is a flowchart illustrating an exemplary method for providing an interactive shopping advisor in accordance with one set of embodiments of the present disclosure. The procedure commences at block 101 where a natural language query is received for a product search. Some illustrative examples of queries may include: "I am looking for a side-by-side stainless steel refrigerator that has a built-in ice maker", "I need to find a wireless printer that will work with my laptop computer", or "What new cars are available with four wheel drive, an eight-cylinder engine, and a moon roof?"

Based upon the received natural language query, an initial product recommendation is generated at block 103. The initial product recommendation may identify a specific model number and manufacturer for a product, or a group of products offered by a given manufacturer, or a group of products from a plurality of different manufacturers. For example, the initial product recommendation may specify a "Maytag™ Model PSD265LGES Stainless Steel Refrigerator", or a "Canon™ MG6300-series Printer", or "White 2016 Ford Expedition, Metallic Grey 2016 Chevy Suburban, and Black 2016 Mitsubishi Forester."

Next, at block 105, a natural language preference parameter is received for refining the product search. For purposes of illustration, the preference parameter may specify "I need a smaller refrigerator that provides no more than 22 cubic feet of storage space", "I would prefer an all-in-one color printer that includes a built-in scanner and fax machine", or "I am looking for a car that is offered in deep cobalt blue."

Then, at block 107, the natural language preference parameter is mapped to a product attribute value for the product search. In the case of the refrigerator, an illustrative product attribute would be storage space in cubic feet. An illustrative product attribute value for this product attribute would be a number, such as 25 cubic feet, that is indicative of the amount of storage space provided by the refrigerator. For the printer, an illustrative product attribute would be fax and scanner capabilities. An illustrative product attribute value would be 00 if a printer lacks both fax and scanner capabilities, and 01 if the printer has fax capabilities but not scanning capabilities, and 11 if the printer has both fax and scanning capabilities. Likewise, in the case of the car, the product attribute would be exterior color. Illustrative product attribute values for color are presented in FIG. 4, to be discussed in greater detail hereinafter.

The operational sequence progresses to block 109 where an adjustment orientation of the product attribute value is identified from the natural language preference parameter. In the refrigerator example discussed previously, assume that the recommended refrigerator provides 26.5 cubic feet of storage space. However, the preference parameter received at block 107 indicates that the consumer wants a smaller refrigerator that provides no more than 22 cubic feet of storage space. In this example, an adjustment orientation would be defined in a negative direction, indicating that the amount of storage space of the initial product recommendation of block 101 needs to be adjusted in a downward direction. Likewise, considering the foregoing printer example, the adjustment orientation would be defined in a narrowing direction to exclude printers that do not also include fax and scanning capabilities. With respect to the car example, the initial product recommendation of block 103 included a white car, a grey car, and a black car, all of which may be considered as relatively plain colors. However, the preference parameter of block 105 indicates that the consumer would rather purchase a deep cobalt blue car which may be regarded as a vivid color. Thus, when the product attribute is exterior color, the product attribute value may be defined along a color axis segment where plain colors are proximate to a first end of the axis segment and vivid colors are proximate to a second end of the axis segment. In this case, the adjustment orientation of the product attribute value would specify an adjustment orientation further away from the first end of the axis segment and closer to the second end of the axis segment.

At block 111, the adjustment orientation determined at block 109 is applied to the natural language query to provide a refined product recommendation for the product search. In the case of the initial product recommendation specifying a "Maytag™ Model PSD265LGES Stainless Steel Refrigerator" with 26.5 cubic feet of storage space, the refined product recommendation of block 111 may specify a "Maytag™ Model PSD215LGES Stainless Steel Refrigerator" with 21.5 cubic feet of space, to satisfy the preference parameter received at block 105. Similarly, the initial product recommendation of a "Canon™ MG6300-series Printer" may be further refined to specify a "Canon™ MG6320 Printer" at block 111, in view of the consumer's preference parameter to purchase a printer that also includes fax and scanning capabilities. Likewise, the initial product recommendation of "White 2016 Ford Expedition, Metallic Grey 2016 Chevy Suburban, and Black 2016 Mitsubishi Forester" is refined at block 111 to only include vehicles that are offered in vivid colors such as deep cobalt blue. For example, the refined recommendation of block 111 may specify "Deep Metallic Blue 2016 Ford Expedition, Azure 2016 Chevy Suburban, and Midnight Blue 2016 Mitsubishi Forester." If a consumer or user desires to further refine the results of block 111, the program loops back to block 105 where a further natural language preference parameter for further refining the product search is received.

The procedure of FIG. 1 may be employed to provide potential consumers with an intelligent shopping advisor that generates prompt, accurate product recommendations during the process of online shopping. The accuracy and relevance of the recommendations may be improved through an iterative process of receiving preference parameters for further refining the search results. The search results may be recursively or repeatedly refined by a user or a consumer until a desired or useful recommendation is generated. The procedure of FIG. 1 involves smooth, natural communication between the user and the intelligent shopping advisor, thereby benefitting the user and online shopping websites.

Figure 2:
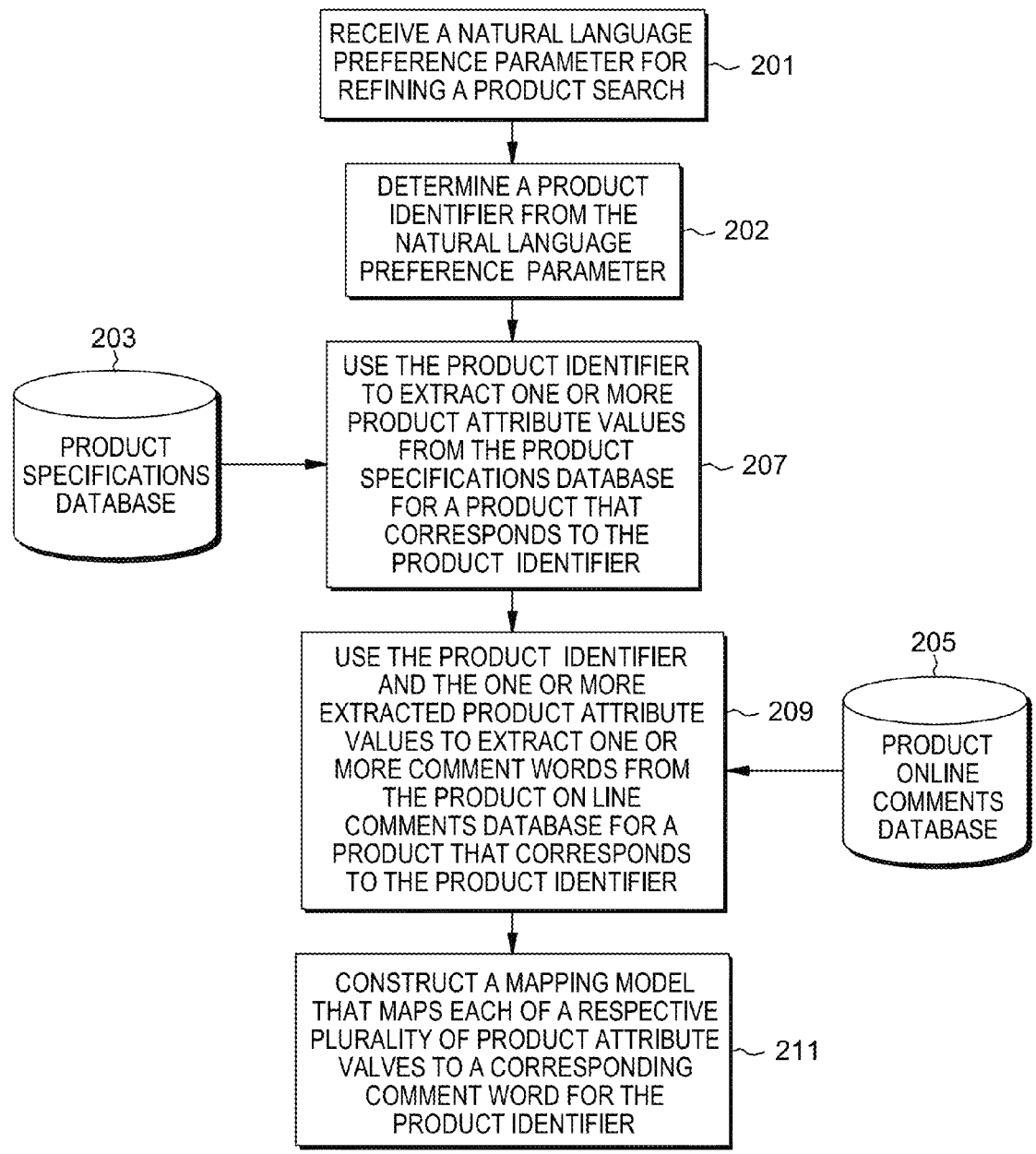
FIG. 2 is a flowchart illustrating an exemplary method for mapping a natural language preference parameter to a product attribute value in accordance with one set of embodiments of the present disclosure.

FIG. 2 is a flowchart illustrating an exemplary method for mapping a natural language preference parameter to a product attribute in accordance with one set of embodiments of the present disclosure. The procedure commences at block 201 where a natural language preference parameter for refining a product search is received. Next, at block 202, a product identifier is determined from the natural language preference parameter. The product identifier can include a generic product category, such as a refrigerator, a computer printer, or a vehicle. Alternatively or additionally, the product identifier can include a specific model number and manufacturer for a product, or a group of products offered by a given manufacturer, or a group of products from a plurality of different manufacturers. For example, the product identifier may specify a "Maytag™ Model PSD265LGES Stainless Steel Refrigerator", or a "Canon™ MG6300-series Printer", or "White 2016 Ford Expedition, Metallic Grey 2016 Chevy Suburban, and Black 2016 Mitsubishi Forester."

The operational sequence progresses from block 202 to block 207 where the product identifier is used to extract one or more product attribute values from a product specifications database 203. For purposes of illustration, the product specifications database 203 may include product specifications for each of a plurality of different product makes and model numbers in each of a plurality of different product categories. Thus, if the product identifier specifies a 2016 Ford Escape™, product attribute values may be extracted from the product specifications database 203 for a product attribute comprising exterior color. These product attribute values specify a set of exterior color choices for the 2016 Ford Escape™. For example, an illustrative set of product attribute values for the 2016 Ford Escape™ comprises deep impact blue, electric spice (intense amber yellow), ingot silver, magnetic (deep metallic grey), oxford white, ruby red, shadow black, sunset (dark orange), and white platinum.

At block 209, the product identifier and the one or more extracted product attribute values are used to extract one or more comment words from a product online comments database 205 for a product that corresponds to the product identifier. For instance, the product online comments database may include online product reviews for each of a plurality of different product makes and model numbers in each of a plurality of different product categories. These online product reviews may be obtained, for example, by mining popular product review websites such as Amazon.com™ and eBay.com™, as well as mining websites provided by individual vendors.

From block 209, program control advances to block 211 where a mapping model is constructed that maps each of a respective plurality of product attribute values to a corresponding comment word for the product identifier. For example, assume that the product identifier is the 2016 Ford Escape™, and the product attribute is color. A first online product review may state that the oxford white car looks very plain. A second online product review may indicate that the ruby red car is very bright and vivid. From this information, a first product attribute value of "white" is mapped to a first comment word "plain", and a second product attribute value of "red" is mapped to a second comment word "vivid" as follows: {white, plain}, and {red, vivid}.

Figure 3:
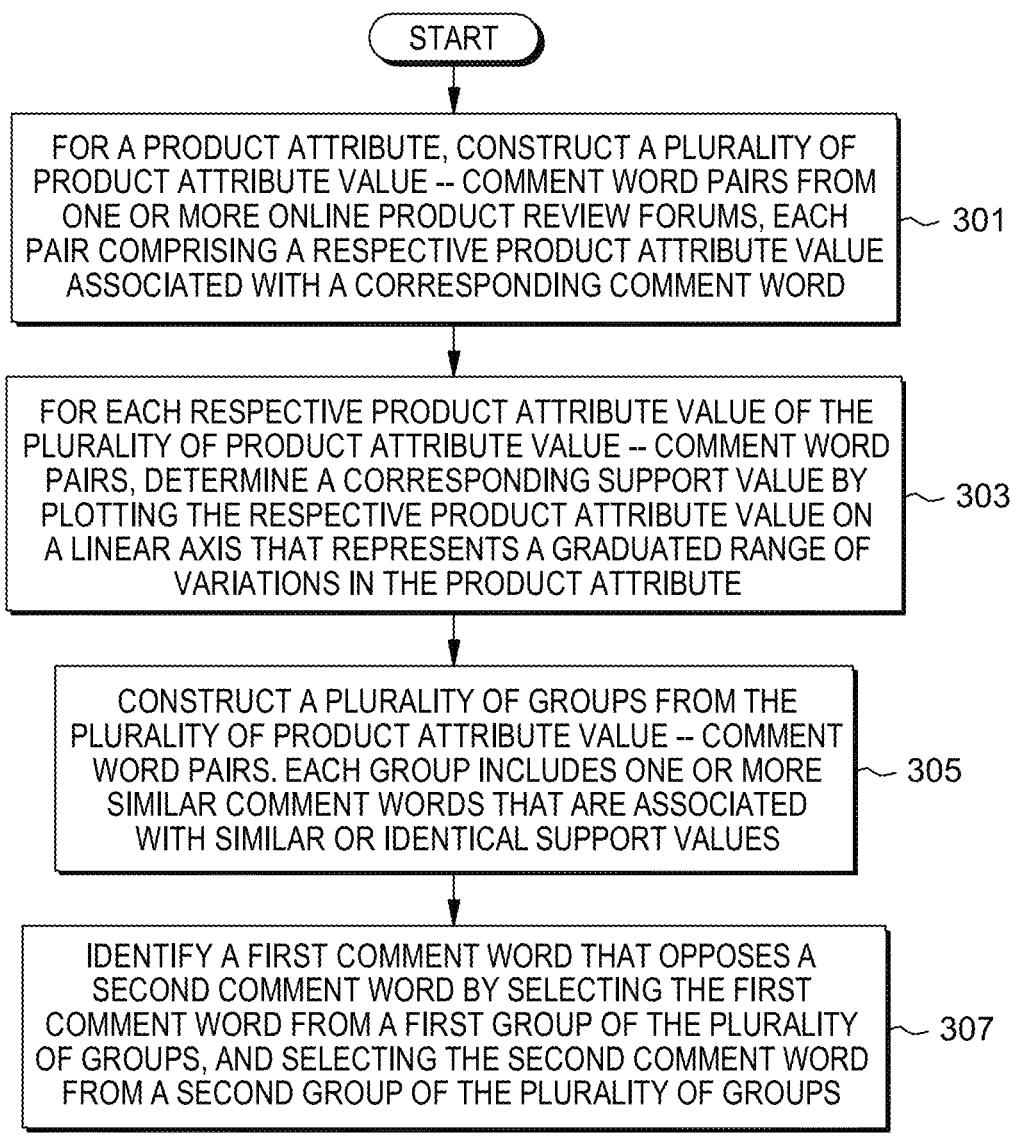
FIG. 3 is a flowchart illustrating an exemplary method for using a respective set of product attribute values to determine a corresponding set of support values in accordance with one set of embodiments of the present disclosure.
Figure 4:
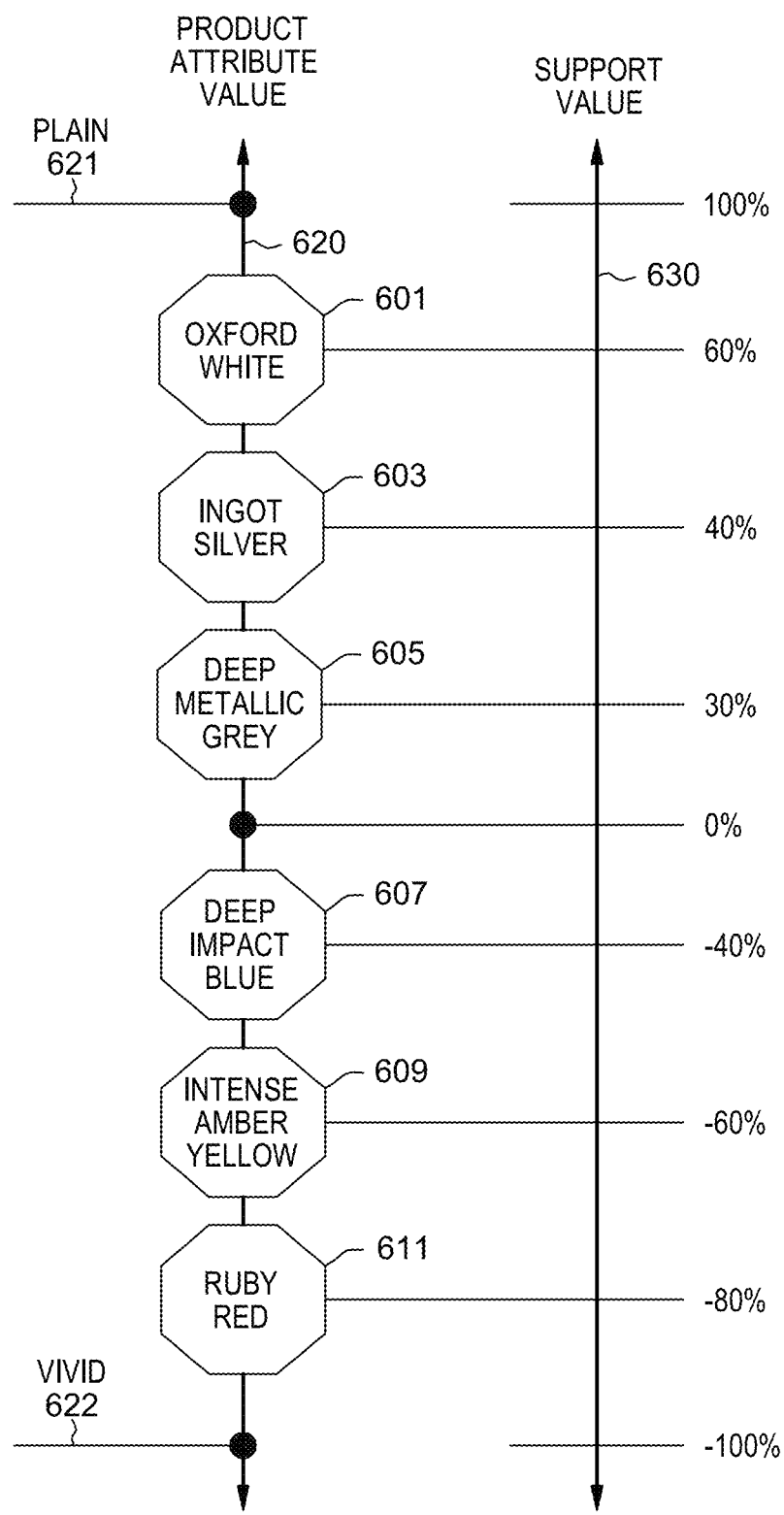
FIG. 4 is a graph showing a respective set of product attribute values for an exemplary product attribute and a corresponding set of support values plotted on a linear axis representing a graduated range of variations in the product attribute.

FIG. 3 is a flowchart illustrating an exemplary method for using a respective set of product attribute values to determine a corresponding set of support values, and FIG. 4 is a graph showing a respective set of product attribute values for an exemplary product attribute and a corresponding set of support values plotted on a linear axis representing a graduated range of variations in the product attribute.

The operational sequence of FIG. 3 commences at block 301 where, for a product attribute, a plurality of product attribute value-comment word pairs are constructed from one or more online product review forums. Each product attribute value-comment word pair comprises a respective product attribute value associated with a corresponding comment word. Returning to the previous example, when the product attribute is exterior color, a first online product review may state that the oxford white car looks very plain. A second online product review may indicate that the ruby red car is very bright and vivid. From this information, a first product attribute value-comment word pair is constructed as {white, plain}, and a second product attribute value-comment word pair is constructed as {red, vivid}.

Next, at block 303, for each respective product attribute value of the plurality of product attribute value-comment word pairs, a corresponding support value 630 (FIG. 4) is determined by plotting the respective product attribute value 620 on a linear axis that represents a graduated range of variations in the product attribute. Consider an example where the product attribute is exterior color. Many online reviews in the product online comments database 205 (FIG. 2) indicate that oxford white is a very plain color. Likewise, many online reviews in the product online comments database 205 indicate that ruby red is a very vivid color. A moderate number of online reviews assert that deep impact blue is a vivid color, and a moderate number of online reviews state that deep metallic grey is a plain color.

Using information gathered from the online reviews of exterior color, a linear axis for the product attribute value 620 (FIG. 4) is defined. A first end of a segment of the linear axis represents a completely plain color 621 with no vivid qualities, and a second end of the segment of the linear axis represents a completely vivid color 622 with no plain qualities. Intermediate points on the segment of the linear axis represent graduated variations in color between the completely plain color 621 and the completely vivid color 622. For example, an oxford white 601 color is an extremely plain color that is situated in closest proximity to the first end of the segment representing the completely plain color 621, relative to the remaining colors that are depicted in FIG. 4. These remaining colors include an ingot silver 603 color, a deep metallic grey 605 color, a deep impact blue 607 color, an intense amber yellow 609 color, and a ruby red 611 color.

The ingot silver 603 color is not as plain as the oxford white 601 color, but the ingot silver 603 color is more plain than the deep metallic grey 605, deep impact blue 607, intense amber yellow 609, and ruby red 611 colors. Likewise, the ruby red 611 color is a very vivid color that is situated in closest proximity to the second end of the segment representing the completely vivid color 622. The intense amber yellow color 609 is a very vivid color, more vivid than the deep impact blue 607 color. At the same time, the intense amber yellow color 609 is not as vivid as the ruby red 611 color.

The operational sequence of FIG. 3 proceeds from block 303 to block 305 where a plurality of groups are constructed from the plurality of product attribute value-comment word pairs. Each group includes one or more similar comment words that are associated with similar or identical support values. For example, with reference to FIG. 4, a first product attribute value-comment word pair may comprise {ruby red 611, bright}, a second product attribute value-comment word pair may comprise {intense amber yellow 609, vivid}, a third product attribute value-comment word pair may comprise {oxford white 601, dull}, and a fourth product attribute value-comment word pair may comprise {ingot silver 603, plain}. Observe that the first product attribute value-comment word pair is associated with a support value of −80%. The second product attribute value-comment word pair is associated with a support value of −60%, the third product attribute value-comment word pair is associated with a support value of +60%, and the fourth product attribute value-comment word pair is associated with a support value of +40%. In this example, the first and second product attribute value-comment word pairs have similar support values (−80% and -60%, respectively), but these support values are very different from the support values of the third and fourth product attribute value-comment word pairs (60% and 40%, respectively). Accordingly, at block 305 (FIG. 3), a first group is constructed that includes the first and second product attribute value-comment word pairs, and a second group is constructed that includes the third and fourth product attribute value-comment word pairs.

Next, at block 307, a first comment word is identified that opposes a second comment word. This identification step is performed by selecting the first comment word from a first group of the plurality of groups, and by selecting the second comment word from a second group of the plurality of groups. Return to the previous example where the first group includes the first and second product attribute value-comment word pairs, and the second group includes the third and fourth product attribute value-comment word pairs. The first group includes the comment words "bright" and "vivid" and, thus, either of these comment words may be selected as the first comment word. Likewise, the second group includes the comment words "dull" and "plain" and, accordingly, either of these comment words may be selected as the second comment word. For instance, assuming that "vivid" is selected for the first comment word and "dull" is selected for the second comment word, the first comment word "vivid" may be considered as an opposing (or opposite) the second comment word "dull".

Figure 5A:
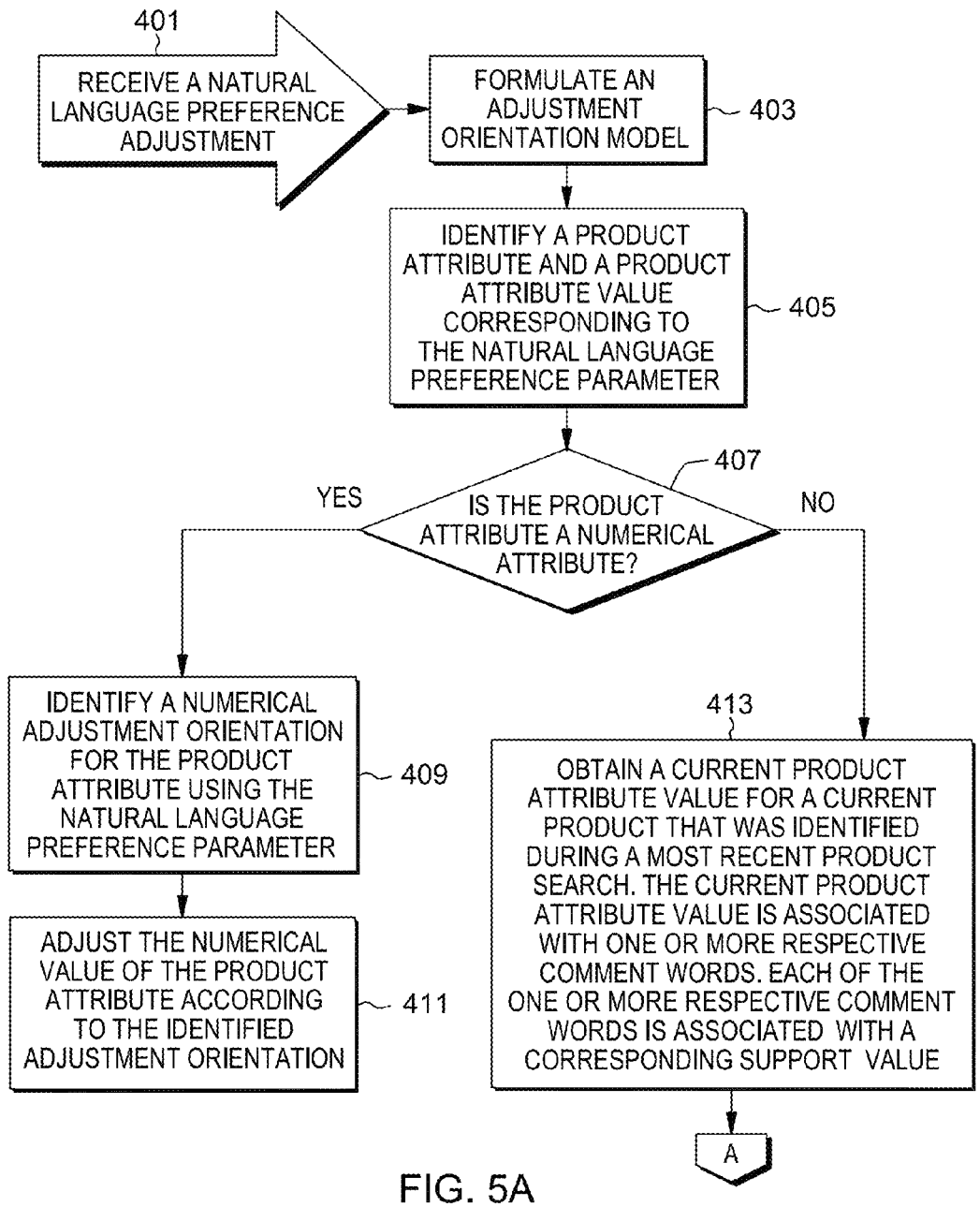
FIGS. 5A and 5B together comprise a flowchart illustrating an exemplary method for formulating an adjustment orientation model in accordance with one set of embodiments of the present disclosure.
Figure 5B:
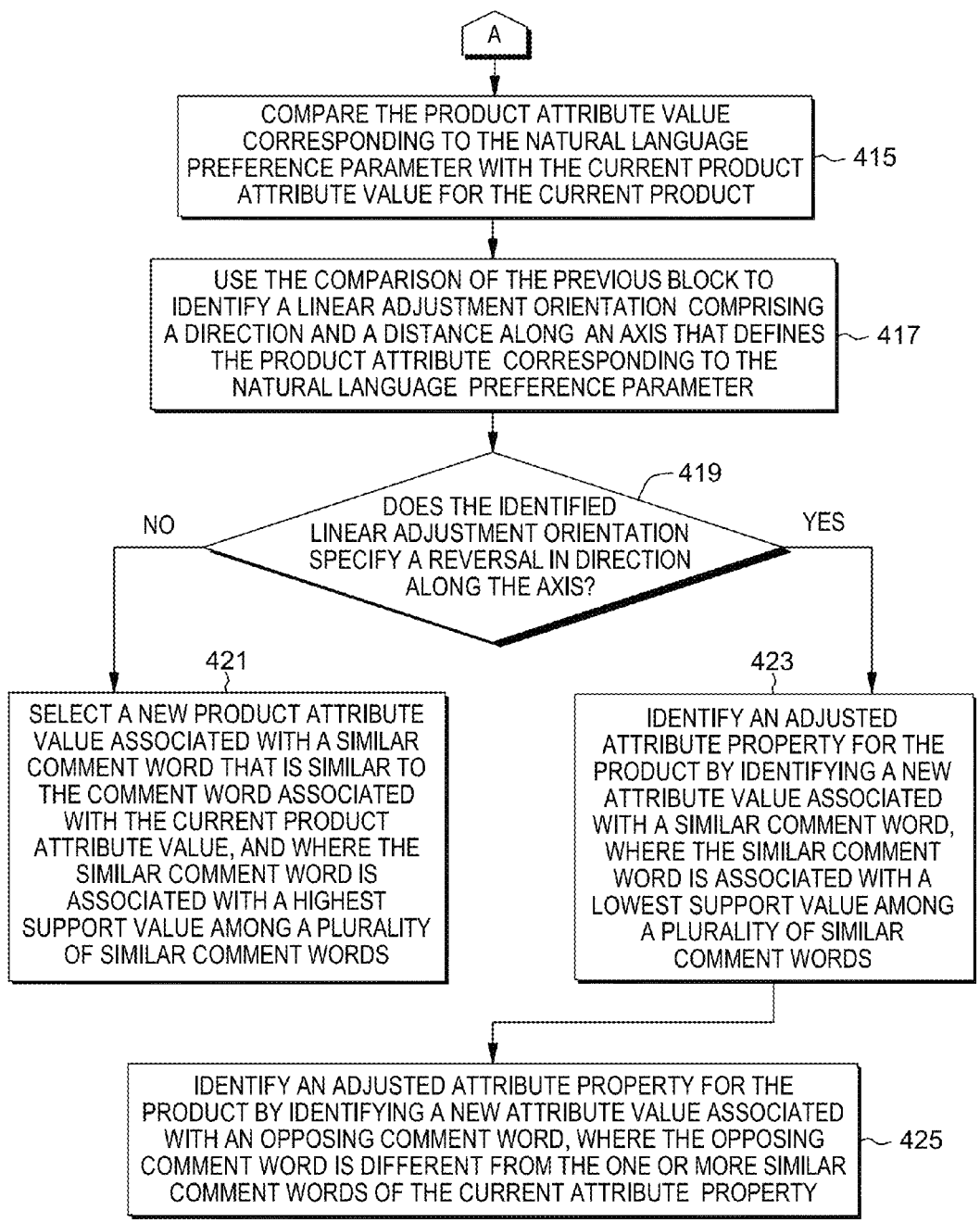

FIGS. 5A and 5B together comprise a flowchart illustrating an exemplary method for formulating an adjustment orientation model in accordance with one set of embodiments of the present disclosure. The operational sequence commences at block 401 (FIG. 5A) where an input is received in the form of a natural language preference parameter. For purposes of illustration, the natural language preference parameter may indicate, "I would like a car with a brighter color", or "I need to find a refrigerator that is smaller and more energy efficient." The natural language preference parameter was previously discussed, for example, at block 105 (FIG. 1) where a user received an initial product recommendation (block 103) that did not fully address the needs of the user. Thus, the user responded to the recommendation with the natural language preference parameter specifying a further refinement of the initial product recommendation.

The operational sequence of FIGS. 5A and 5B proceeds to block 403 (FIG. 5A) where an adjustment orientation model is formulated. A product attribute and a product attribute value corresponding to the received natural language preference parameter are identified (block 405). Next, at block 407, a test is performed to ascertain whether or not the product attribute is a numerical attribute. For instance, if the product attribute specifies an amount of cubic feet of storage space provided by a refrigerator, a number of cylinders provided in an engine of a vehicle, or a number of watts of output power for a home theater audio system, these are all examples of numerical attributes. On the other hand, an exterior color for the vehicle or the refrigerator is not a numerical attribute. Likewise, an operating system provided by a smartphone, such as Android™ or iOS™, is not a numerical attribute.

If the product attribute is a numerical attribute, the operational sequence advances to block 409 where a numerical adjustment orientation is identified for the product attribute using the natural language preference parameter 409. For example, if the product attribute is storage space provided by a refrigerator, and the current product attribute value is 26.5 cubic feet, and if the natural language preference parameter indicates a preference for a smaller refrigerator, the adjustment orientation is implemented in a negative direction that focuses upon smaller refrigerators relative to the refrigerator that was specified in the initial product recommendation. On the other hand, if the natural language preference parameter had indicated a preference for a larger refrigerator, then the adjustment orientation would be implemented in a positive direction that focuses upon larger refrigerators relative to the refrigerator that was specified in the initial product recommendation. Then, at block 411, the numerical value of the product attribute is adjusted according to the identified adjustment orientation.

The negative branch from block 407 leads to block 413 where a current product attribute is obtained for a current product that was identified during a most recent product search. The current product attribute value is associated with one or more respective comment words. Each of the one or more respective comment words is associated with a corresponding support value. Then, at block 415 (FIG. 5B), the product attribute value corresponding to the natural language preference parameter is compared with the current product attribute value for the current product. The program advances to block 417 where the comparison of block 415 is used to identify a linear adjustment orientation comprising a direction and a distance along an axis that defines the product attribute corresponding to the natural language preference parameter.

Program control advances to block 419 where a test is performed to ascertain whether or not the identified linear adjustment orientation specifies a reversal in direction along the axis. If not, the program continues to block 421 where a new product attribute value is selected that is associated with a similar comment word that is similar to the comment word associated with the current product attribute value, and where the similar comment word is associated with a highest support value among a plurality of similar comment words.

The affirmative branch from block 419 leads to block 423. Alternatively or additionally, the affirmative branch from block 419 leads to block 425. At block 423, an adjusted product attribute value for the product attribute is determined by identifying a new product attribute value associated with a similar comment word, where the similar comment word is associated with a lowest support value among a plurality of similar comment words. Alternatively or additionally, at block 425, an adjusted product attribute value for the product attribute is determined by identifying a new product attribute value associated with an opposing comment word, where the opposing comment word is different from the one or more similar comment words of the current product attribute value.

Figure 6:
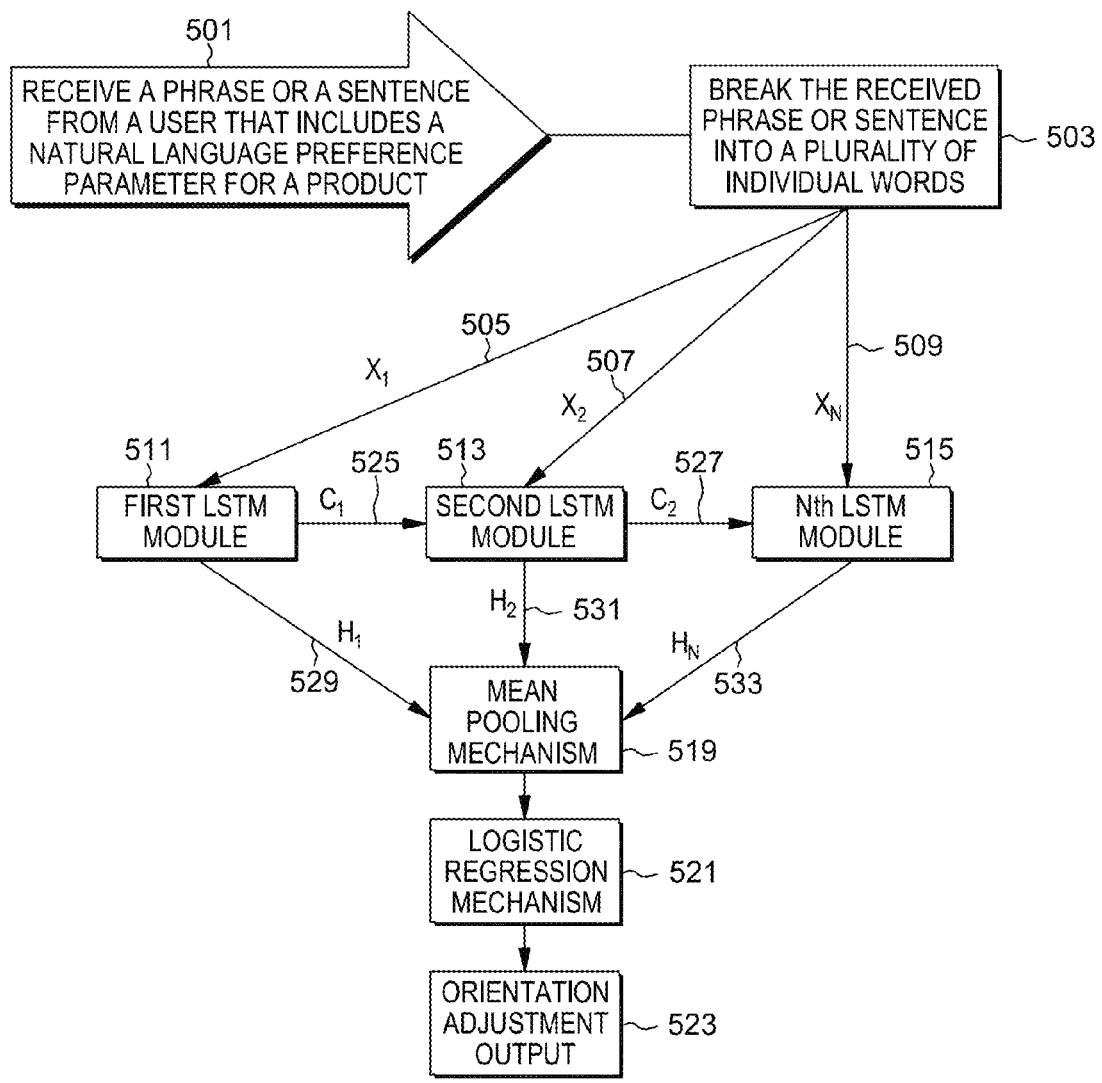
FIG. 6 is an information flow diagram showing an illustrative procedure for generating an orientation adjustment output from a received natural language preference parameter in accordance with one set of embodiments of the present disclosure.

FIG. 6 is an information flow diagram showing an illustrative procedure for generating an orientation adjustment output from a received natural language preference parameter in accordance with one set of embodiments of the present disclosure. At block 501, an input is received in the form of a phrase or a sentence from a user that includes a natural language preference parameter for a product. Next, at block 503, the received phrase or sentence is broken down into a plurality of individual words.

Each of respective individual words is inputted to a corresponding Long Short Term Memory (LSTM) module. For example, a first word $X_1$ 505 is inputted to a first LSTM module 511. A second word $X_2$ 507 is inputted to a second LSTM module 513, and an Nth word $X_N$ 509 is inputted to an Nth LSTM module 515. Each of the LSTM modules 511, 513, and 515 is a smart network unit that can remember a value for an arbitrary length of time. Each of the LSTM modules 511, 513, and 515 includes one or more gates that determine when an input value is significant enough to remember, when the module should continue to remember or forget the input value, and when the module should output the input value.

The first, second, and Nth LSTM modules 511, 513, and 515 comprise an LSTM network. The LSTM network is an illustrative type of recurrent neural network (RNN) architecture for implementing a neural network. At a high level, the LSTM network is based on human thinking. Humans do not start thinking from scratch every second. While reading, humans understand each word based upon their understanding of previous words. In other words, human thoughts have persistence. Traditional neural networks do not provide persistence, but RNNs and LSTM networks address the persistence issue by utilizing one or more loops that allow information to persist.

LSTM networks can be used to compute anything that a computer can compute, so long as the LSTM network is provided with an appropriate weight matrix. LSTM networks are able to learn from experience, and to classify, process, and predict time series in situations where there are very long time lags of unknown duration between relevant events. This is one of the reasons why LSTM networks outperform alternative RNNs, Hidden Markov Models, and other sequence learning methods.

The first LSTM module 511 has a first cell state line 525 which is fed to the second LSTM module 513. Likewise, the second LSTM module 513 has a second cell state line 527 which is fed to the Nth LSTM module 515. Similarly, the Nth LSTM module 515 has an Nth cell state line 528. The first, second, and Nth cell state lines 525, 527 and 528 may be conceptualized as a conveyor belt running through an entire chain of LSTM modules including the first LSTM module 511, the second LSTM module 513, and the Nth LSTM module 515. In some cases, information may flow along the conveyor belt unchanged. In other situations, information may be removed from the conveyor belt. Each of the LSTM modules 511, 513, and 515 is configured for removing or adding information to the conveyor belt comprising cell state lines 525, 527 and 528.

The first LSTM module 511 generates a first output $H_1$ 529, the second LSTM module 513 generates a second output $H_2$ 531, and the Nth LSTM module 515 generates an Nth output $H_N$ 533. The first output $H_1$ 529, the second output $H_2$ 531, and the Nth output $H_N$ 533 are fed to a mean pooling mechanism 519. The mean pooling mechanism 519 is used to aggregate statistics of the LSTM outputs $H_1$, $H_2$, and $H_N$ 529, 531, and 533 at various locations in the received phrase or sentence. For example, one could compute the mean (or max) value of a particular feature over a region of the received phrase or sentence. These summary statistics are much lower in dimension (compared to using all of the extracted features) and can also improve results (less overfitting). The output of the mean pooling mechanism 519 is fed to a logistic regression mechanism 521.

The logistic regression mechanism 521 is configured for performing a logistic regression procedure to analyze the natural language preference parameter that has been processed by the LSTM network (first, second, and Nth LSTM modules 511, 513, and 515) and the mean pooling mechanism 519. Logistic regression is a statistical method for analyzing a dataset in which there are one or more independent variables that determine an outcome. The outcome is measured with a dichotomous variable in which there are only two possible outcomes. The dependent variable is binary or dichotomous in the sense that it only contains data coded as 1 (TRUE, success, pregnant, etc.) or 0 (FALSE, failure, non-pregnant, etc.). In the present scenario, the dependent variable provides an indication as to whether an orientation adjustment output 523 is predicted to be in a positive direction or a negative direction. Like all regression analyses, logistic regression is a predictive analysis. Logistic regression is used to describe data and to explain the relationship between one dependent binary variable and a set of one or more metric (interval or ratio scale) independent variables.

One goal of logistic regression is to find a best-fitting (yet reasonable) model to describe the relationship between the dichotomous characteristic of interest (dependent variable=response or outcome variable, which in the present example is the orientation adjustment output 523) and the set of independent (predictor or explanatory) variables. Logistic regression generates a set of coefficients (and standard errors and significance levels) of a formula to predict a log it transformation that represents a probability that a characteristic of interest is present: $\log it(p)=b_0+b_1X_1+b_2X_2 \ldots +b_kX_k$, where p is the probability of presence of the characteristic of interest, such as the orientation adjustment output 523 being predicted to be in a positive direction. The log it transformation is defined in terms of a logged odds where odds=p/(1−p)=(probability of presence of characteristic)/(probability of absence of characteristic), and $\log it(p)=\ln (p/(1-p))$. Rather than choosing parameters that minimize the sum of squared errors (as in ordinary regression), estimation in logistic regression chooses parameters that maximize the likelihood of observing sample values.

Figure 7:
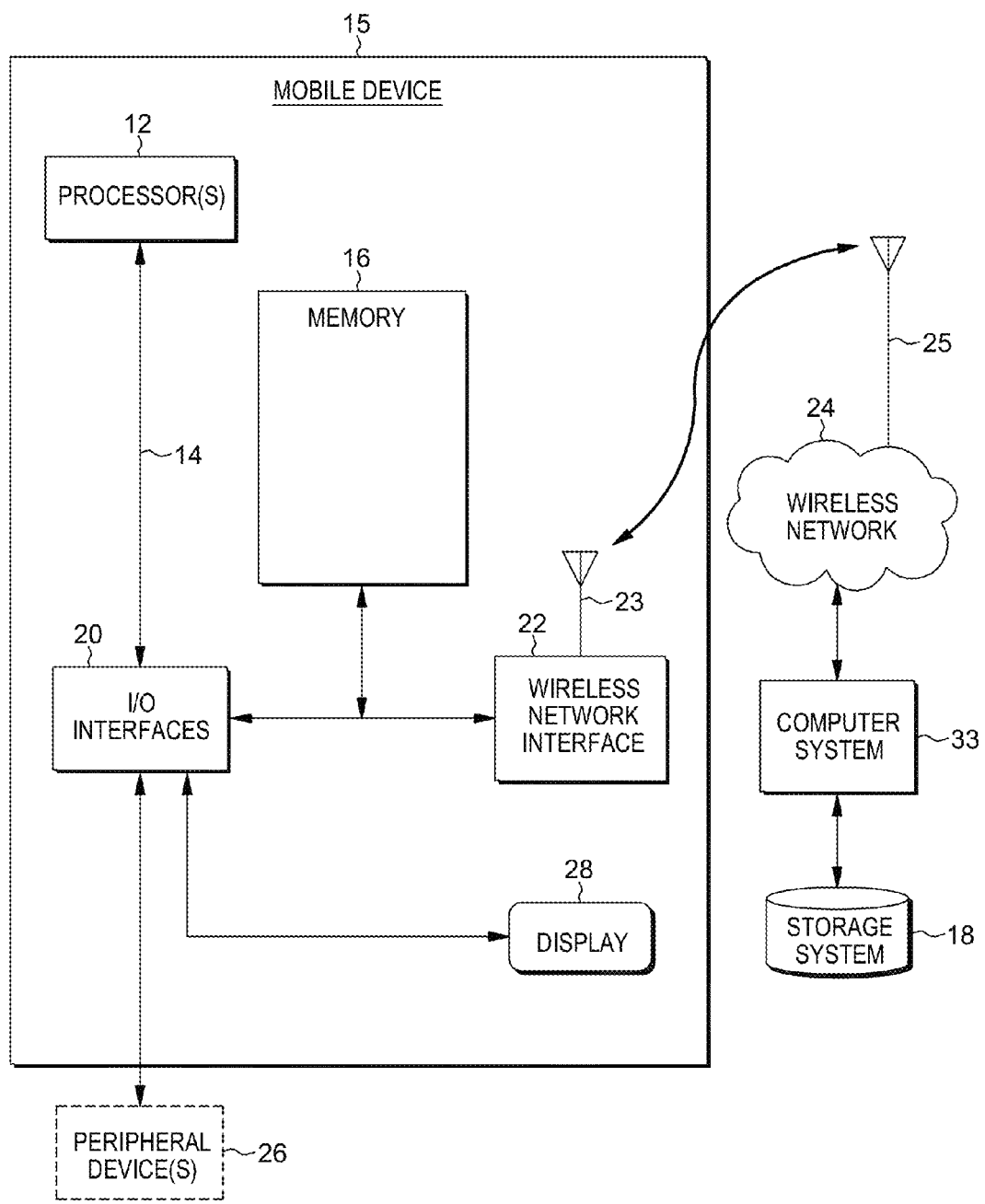
FIG. 7 is a hardware block diagram of an exemplary apparatus for providing an interactive shopping advisor in accordance with any of the procedures of FIGS. 1-3 and 5A-6.

FIG. 7 is a hardware block diagram of an exemplary system for providing an interactive shopping advisor in accordance with any of the procedures of FIGS. 1-3 and 5A-6. The system includes a mobile device 15 operatively coupled to a computer system 33 over a wireless network 24. For illustrative purposes, the mobile device 15 may accept queries from a user including a natural language query for a product search and one or more natural language preference parameters for refining the search. In the example of FIG. 7, the mobile device 15 is a portable computing device. Some illustrative examples of the mobile device 15 include a smartphone, a tablet computer, a cellphone, a personal digital assistant (PDA), a portable communications device, or a navigation system. However, it is to be understood that a personal computer, laptop computer, tablet device, or other computing device may be used in lieu of, or in addition to, the mobile device 15 for purposes of accepting user product queries and preference parameters. The mobile device 15 is only one example of a suitable processing system and is not intended to suggest any limitation as to the scope of use or functionality of embodiments of the methodology described herein.

The mobile device 15 includes one or more processors 12 operatively coupled to a computer-readable memory 16. The memory 16 can include computer system readable media in the form of volatile memory, or non-volatile memory, or any of various combinations thereof. Some illustrative examples of volatile memory include random access memory (RAM) and/or cache memory, or other types of memory devices, or any of various combinations thereof. Some illustrative examples of non-volatile memory include read-only memory (ROM), magnetic media such as a "hard drive", a solid-state storage drive, or an optical disk drive. The memory 16 includes an operating system (OS) that is executed by the one or more processors 12. Illustrative examples of operating systems include Android™ and Apple iOS™. The one or more processors 12 are configured to execute various types of software applications, sometimes referred to as apps.

The one or more processors 12 may be described in the general context of computer system executable instructions, such as program modules, being executed by a computer system. Generally, program modules may include routines, programs, objects, components, logic, data structures, and so on that perform particular tasks or implement particular abstract data types. Thus, the one or more processors 12 may include a module that performs the methods described herein with reference to FIG. 1. The module may be programmed into the integrated circuits of the one or more processors 12, or loaded from the memory 16, or the wireless network 24, or any of various combinations thereof.

The mobile device 15 may be operational with numerous other general purpose or special purpose computing system environments or configurations. Thus, the mobile device 15 includes a wireless network interface 22 coupled to a first antenna 23. The wireless network interface 22 and the first antenna 23 are configured for communicating with a wireless network 24 that is coupled to a second antenna 25. The wireless network 24 is operatively coupled to a computer system 33. Accordingly, a notification may be sent from the mobile device 15 to the computer system 33 over the wireless network 24 in response to a user of the mobile device 15 initiating a new application on the mobile device. In response to the notification, the computer system 33 performs the procedure of FIG. 1.

Illustratively, the wireless network interface 22 is configured for implementing wireless communication using a wireless standard such as Global System for Mobile Communications (GSM), Universal Mobile Telecommunications System (UMTS), Code Division Multiple Access (CDMA), Long-Term Evolution (LTE), 2G, 3G, 4G, 5G, Near Field Communications (NFC), WiFi, WiMAX, or Bluetooth. In general, these wireless standards are configured for efficiently dividing the finite RF spectrum among multiple users. For example, GSM uses time-division multiple access (TDMA) and frequency-division multiple access (FDMA) to provide separation among users and cells. UMTS and CDMA-2000 use code-division multiple access (CDMA). WiMAX and LIE use orthogonal frequency division multiplexing (OFDM). Illustratively, the mobile device 15 uses one or more of the foregoing wireless standards to access the Internet through the wireless network 24.

TDMA provides mobile device 15 access to the wireless network 24 by chopping up a physical RF communications channel occupying a given frequency bandwidth into sequential time slices. Each user of the channel takes turns to transmit and receive signals. In reality, only one mobile device 15 is actually using the channel at any specific moment in time. This is analogous to time-sharing on a large computer server.

FDMA provides multiuser access by separating the frequencies used by each of a plurality of mobile devices such as the mobile device 15. In GSM, the FDMA approach is used to separate each of a plurality of cells of the wireless network 24, and then TDMA is used to separate each of a plurality of mobile device 15 users within the cell.

CDMA uses spread-spectrum digital modulation to spread voice data over a very wide channel in pseudorandom fashion using a mobile device 15-specific or cell-specific pseudorandom code. A receiver at the wireless network 24 undoes the randomization to collect the bits together and produce the original voice data. As the codes are pseudorandom and selected in such a way as to cause minimal interference to one another, multiple users can talk at the same time and multiple cells can share the same frequency. This causes an added signal noise forcing all users to use more power, which in exchange decreases cell range and battery life.

Orthogonal Frequency Division Multiple Access (OFDMA) uses bundling of multiple small frequency bands that are orthogonal to one another to provide for separation of mobile device 15 users. The users are multiplexed in the frequency domain by allocating specific sub-bands to individual users. This is often enhanced by also performing TDMA and changing the allocation periodically so that different users are assigned different sub-bands at different times. The foregoing wireless standards are provided solely for purposes of illustration, as the mobile device 15 may be configured for communicating with the wireless network 24 using any communications standard.

The mobile device 15 includes an input/output (I/O) interface 20. The I/O interface is used to interface the one or more processors 12 to the wireless network interface 22, a display 28, and one or more optional peripheral devices 26 such as a keyboard, a pointing device, or one or more devices that enable a user to interact with the mobile device 15. The display 28 may be provided in the form of a touch-sensitive screen and/or a miniature keyboard. The touch-sensitive screen may be configured to accept a tactile input or a stylus input, or both. The optional peripheral devices 26 may also include any device, such as a network card or a modem, that enables the mobile device 15 to communicate with one or more other computing devices. Such communication can occur via the I/O interface 20.

The computer system 33 may include a variety of computer system readable media. Such media may be any available media that is accessible by computer system, and it may include both volatile and non-volatile media, removable and non-removable media. The computer system is configured for performing any of the methods described previously in conjunction with FIGS. 1-3 and 5A-6. Moreover, the computer system 33 may be configured for accessing a storage system 18 on which one or more programs configured for implementing any of the methods of FIGS. 1-3 and 5A-6 are stored. The computer system 33 may be described in the general context of computer system executable instructions, such as program modules, being executed by a computer system. The computer system 33 may include a server. Generally, program modules may include routines, programs, objects, components, logic, data structures, and so on that perform particular tasks or implement particular abstract data types. Examples of well-known computing systems, environments, and/or configurations that may be suitable for implementing the computer system 33 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 33 may be practiced in distributed cloud computing environments where tasks are performed by remote processing devices that are linked through a communications network such as the wireless network 24. In a distributed cloud computing environment, program modules may be located in both local and remote computer system storage media including memory storage devices such as the storage system 18.

The computer system 33 may further include other removable/non-removable, volatile/non-volatile computer system storage media. By way of example only, the storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

Both the mobile device 15 and the computer system 33 can communicate with one or more networks, such as the wireless network 24, a local area network (LAN), a general wide area network (WAN), and/or a public network (e.g., the Internet). It should be understood that although not shown, other hardware and/or software components could be used in conjunction with the computer system 33. Examples include, but are not limited to: microcode, device drivers, redundant processing units, external disk drive arrays, RAID systems, tape drives, and data archival storage systems, etc.

The mobile device 15 may be equipped with a source of battery power. Optionally, the mobile device 15 may also be equipped with a Global Positioning System (GPS) receiver for utilizing one or more location-based services. Other optional features of the mobile device 15 may include a camera, a media player for playing back video or music files, or one or more sensors. Such sensors may include an accelerometer, a compass, a magnetometer, or a gyroscope, allowing detection of orientation of motion. Optionally, the mobile device 15 may provide biometric user authentication, such as using a built-in camera for facial recognition or using a fingerprint sensor for fingerprint recognition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for providing an interactive shopping advisor, the method comprising:
   configuring a plurality of long short term memory modules as a recurrent neural network, wherein the plurality of long short term memory modules are each provided with one or more respective gates for determining when a corresponding input value of a plurality of input values should persist in memory, and when the corresponding input value should comprise an output value;
   receiving, by the recurrent neural network, a natural language query for a product search, wherein each respective long short term memory module of the plurality of long short term memory modules receives a corresponding word from the natural language query;
   generating, by the recurrent neural network, an initial product recommendation from the natural language query;
   receiving, by the recurrent neural network, a natural language preference parameter for refining the product search;
   mapping, by the recurrent neural network, the natural language preference parameter to a product attribute value for the product search;
   identifying, by the recurrent neural network, an adjustment orientation of the product attribute value from the natural language preference parameter; and
   applying, by the recurrent neural network, the adjustment orientation to the natural language query to provide a refined product recommendation for the product search by determining, for each of the one or more respective gates, when the corresponding input value should persist in memory, and when the corresponding input value should comprise an output value.

2. The computer-implemented method of claim 1, wherein the mapping of the natural language preference parameter to a product attribute value is performed by:
   determining a product identifier from the received natural language preference parameter;
   using the product identifier to extract one or more product attribute values from a product specifications database for a product that corresponds to the product identifier;
   using the product identifier and the one or more extracted product attribute values to extract one or more comment words from a product online comments database for a product that corresponds to the product identifier; and
   performing the mapping by associating each of a respective plurality of product attribute values with a corresponding comment word for the product identifier.

3. The computer-implemented method of claim 1, wherein the identifying of an adjustment orientation is performed by:

identifying a product attribute corresponding to the natural language preference parameter; and when the product attribute is a numerical attribute:

identifying a numerical adjustment orientation for the product attribute using the natural language preference parameter; and adjusting a numerical value of the product attribute according to the identified adjustment orientation.

4. The computer-implemented method of claim 1, wherein the identifying of an adjustment orientation is performed by:

identifying a product attribute corresponding to the natural language preference parameter; and when the product attribute is not a numerical attribute:

obtaining a current product attribute value for a current product that was identified during a most recent product search, wherein the current product attribute value is associated with one or more respective comment words, and wherein each of the one or more respective comment words is associated with a corresponding support value; and comparing the current product attribute value with the product attribute value to which the natural language preference parameter is mapped, to identify a linear adjustment orientation comprising a direction and a distance along an axis that defines the product attribute corresponding to the natural language preference parameter.

5. The computer-implemented method of claim 1 further comprising constructing a plurality of value-word pairs for a product attribute, each value-word pair comprising a respective product attribute value associated with a corresponding comment word.

6. The computer-implemented method of claim 5 wherein, for each respective product attribute value of the plurality of value-word pairs, a corresponding support value is determined by plotting the respective product attribute value on a linear axis that represents a graduated range of variations in the product attribute.

7. A computer program product for providing an interactive shopping advisor, the computer program product comprising a computer-readable storage medium having a computer-readable program stored therein, wherein the computer-readable program, when executed on a processor, causes the processor to:

configure a plurality of long short term memory modules as a recurrent neural network, wherein the plurality of long short term memory modules are each provided with one or more respective gates for determining when a corresponding input value of a plurality of input values should persist in memory, and when the corresponding input value should comprise an output value;

receive a natural language query for a product search, wherein each respective long short term memory module of the plurality of long short term memory modules receives a corresponding word from the natural language query;

generate an initial product recommendation from the natural language query;

receive a natural language preference parameter for refining the product search;

map the natural language preference parameter to a product attribute value for the product search;

identify an adjustment orientation of the product attribute value from the natural language preference parameter; and apply the adjustment orientation to the natural language query to provide a refined product recommendation for the product search by determining, for each of the one or more respective gates, when the corresponding input value should persist in memory, and when the corresponding input value should comprise an output value.

8. The computer program product of claim 7 further configured for mapping the natural language preference parameter to a product attribute value by:

determining a product identifier from the received natural language preference parameter;

using the product identifier to extract one or more product attribute values from a product specifications database for a product that corresponds to the product identifier;

using the product identifier and the one or more extracted product attribute values to extract one or more comment words from a product online comments database for a product that corresponds to the product identifier; and performing the mapping by associating each of a respective plurality of product attribute values with a corresponding comment word for the product identifier.

9. The computer program product of claim 7 further configured for identifying the adjustment orientation by:

identifying a product attribute corresponding to the natural language preference parameter; and when the product attribute is a numerical attribute:

identifying a numerical adjustment orientation for the product attribute using the natural language preference parameter; and adjusting a numerical value of the product attribute according to the identified adjustment orientation.

10. The computer program product of claim 7 further configured for identifying the adjustment orientation by:

identifying a product attribute corresponding to the natural language preference parameter; and when the product attribute is not a numerical attribute:

obtaining a current product attribute value for a current product that was identified during a most recent product search, wherein the current product attribute value is associated with one or more respective comment words, and wherein each of the one or more respective comment words is associated with a corresponding support value; and comparing the current product attribute value with the product attribute value to which the natural language preference parameter is mapped, to identify a linear adjustment orientation comprising a direction and a distance along an axis that defines the product attribute corresponding to the natural language preference parameter.

11. The computer program product of claim 7 further configured for constructing a plurality of value-word pairs for a product attribute, each value-word pair comprising a respective product attribute value associated with a corresponding comment word.

12. The computer program product of claim 11 wherein, for each respective product attribute value of the plurality of value-word pairs, the computer program product is further configured for determining a corresponding support value by plotting the respective product attribute value on a linear axis that represents a graduated range of variations in the product attribute.

13. An apparatus for providing an interactive shopping advisor, the apparatus comprising a processor and a memory coupled to the processor, wherein the memory comprises instructions which, when executed by the processor, cause the processor to:
  configure a plurality of long short term memory modules as a recurrent neural network, wherein the plurality of long short term memory modules are each provided with one or more respective gates for determining when a corresponding input value of a plurality of input values should persist in memory, and when the corresponding input value should comprise an output value;
  receive a natural language query for a product search, wherein each respective long short term memory module of the plurality of long short term memory modules receives a corresponding word from the natural language query;
  generate an initial product recommendation from the natural language query;
  receive a natural language preference parameter for refining the product search;
  map the natural language preference parameter to a product attribute value for the product search;
  identify an adjustment orientation of the product attribute value from the natural language preference parameter; and
  apply the adjustment orientation to the natural language query to provide a refined product recommendation for the product search by determining, for each of the one or more respective gates, when the corresponding input value should persist in memory, and when the corresponding input value should comprise an output value.

14. The apparatus of claim 13 further configured for mapping the natural language preference parameter to a product attribute value by:
  determining a product identifier from the received natural language preference parameter;
  using the product identifier to extract one or more product attribute values from a product specifications database for a product that corresponds to the product identifier;
  using the product identifier and the one or more extracted product attribute values to extract one or more comment words from a product online comments database for a product that corresponds to the product identifier; and
  performing the mapping by associating each of a respective plurality of product attribute values with a corresponding comment word for the product identifier.

15. The apparatus of claim 13 further configured for identifying the adjustment orientation by:
  identifying a product attribute corresponding to the natural language preference parameter; and
  when the product attribute is a numerical attribute:
    identifying a numerical adjustment orientation for the product attribute using the natural language preference parameter; and
    adjusting a numerical value of the product attribute according to the identified adjustment orientation.

16. The apparatus of claim 13 further configured for identifying the adjustment orientation by:
  identifying a product attribute corresponding to the natural language preference parameter; and
  when the product attribute is not a numerical attribute:
    obtaining a current product attribute value for a current product that was identified during a most recent product search, wherein the current product attribute value is associated with one or more respective comment words, and wherein each of the one or more respective comment words is associated with a corresponding support value; and
    comparing the current product attribute value with the product attribute value to which the natural language preference parameter is mapped, to identify a linear adjustment orientation comprising a direction and a distance along an axis that defines the product attribute corresponding to the natural language preference parameter.

17. The apparatus of claim 13 further configured for constructing a plurality of value-word pairs for a product attribute, each value-word pair comprising a respective product attribute value associated with a corresponding comment word.

18. The apparatus of claim 17 wherein, for each respective product attribute value of the plurality of value-word pairs, the apparatus is further configured for determining a corresponding support value by plotting the respective product attribute value on a linear axis that represents a graduated range of variations in the product attribute.

19. An interactive shopping advisor comprising:
  one or more processors for executing programs;
  a non-transitory memory operatively coupled to the one or more processors;
  a network interface device operatively coupled to the one or more processors for communicating with a user via a communications network; and
  a program stored in the memory for:
  configuring a plurality of long short term memory modules as a recurrent neural network, wherein the plurality of long short term memory modules are each provided with one or more respective gates for determining when a corresponding input value of a plurality of input values should persist in memory, and when the corresponding input value should comprise an output value;
  receiving a natural language query for a product search, wherein each respective long short term memory module of the plurality of long short term memory modules receives a corresponding word from the natural language query;
  generating an initial product recommendation from the natural language query;
  receiving a natural language preference parameter for refining the product search;
  mapping the natural language preference parameter to a product attribute value for the product search;
  identifying an adjustment orientation of the product attribute value from the natural language preference parameter; and
  applying the adjustment orientation to the natural language query to provide a refined product recommendation for the product search by determining, for each of the one or more respective gates, when the corresponding input value should persist in memory, and when the corresponding input value should comprise an output value.

20. The interactive shopping advisor of claim 19 further configured for mapping the natural language preference parameter to a product attribute value by:
  determining a product identifier from the received natural language preference parameter;
  using the product identifier to extract one or more product attribute values from a product specifications database for a product that corresponds to the product identifier;
  using the product identifier and the one or more extracted product attribute values to extract one or more comment words from a product online comments database for a product that corresponds to the product identifier; and performing the mapping by associating each of a respective plurality of product attribute values with a corresponding comment word for the product identifier.

21. The interactive shopping advisor of claim 19 further configured for identifying the adjustment orientation by:

identifying a product attribute corresponding to the natural language preference parameter; and when the product attribute is a numerical attribute:

identifying a numerical adjustment orientation for the product attribute using the natural language preference parameter; and adjusting a numerical value of the product attribute according to the identified adjustment orientation.

22. The interactive shopping advisor of claim 19 further configured for identifying the adjustment orientation by:

identifying a product attribute corresponding to the natural language preference parameter; and when the product attribute is not a numerical attribute:

obtaining a current product attribute value for a current product that was identified during a most recent product search, wherein the current product attribute value is associated with one or more respective comment words, and wherein each of the one or more respective comment words is associated with a corresponding support value; and comparing the current product attribute value with the product attribute value to which the natural language preference parameter is mapped, to identify a linear adjustment orientation comprising a direction and a distance along an axis that defines the product attribute corresponding to the natural language preference parameter.

23. The interactive shopping advisor of claim 19 further configured for constructing a plurality of value-word pairs for a product attribute, each value-word pair comprising a respective product attribute value associated with a corresponding comment word.

24. The interactive shopping advisor of claim 23 wherein, for each respective product attribute value of the plurality of value-word pairs, the interactive shopping advisor is further configured for determining a corresponding support value by plotting the respective product attribute value on a linear axis that represents a graduated range of variations in the product attribute.

* * * * *